US006240746B1

(12) United States Patent
Maeda et al.

(10) Patent No.: US 6,240,746 B1
(45) Date of Patent: Jun. 5, 2001

(54) GLASS PLATE BENDING METHOD AND APPARATUS

(75) Inventors: Kenji Maeda; Toshimi Yajima; Katsuki Saito, all of Aichi; Yasuichi Ueno, Aikawa-machi; Masaaki Konishi, Yokohama; Hiroshi Yamakawa, Aikawa-machi, all of (JP)

(73) Assignee: Asahi Glass Company Ltd., Tokyo (JP)

( * ) Notice: Subject to any disclaimer, the term of this patent is extended or adjusted under 35 U.S.C. 154(b) by 0 days.

(21) Appl. No.: 09/194,422

(22) PCT Filed: Apr. 3, 1998

(86) PCT No.: PCT/JP98/01558

§ 371 Date: Jan. 11, 1999

§ 102(e) Date: Jan. 11, 1999

(87) PCT Pub. No.: WO98/45214

PCT Pub. Date: Oct. 15, 1998

(30) Foreign Application Priority Data

| Apr. 4, 1997 | (JP) | 9-86975 |
| Apr. 4, 1997 | (JP) | 9-87002 |
| Apr. 4, 1997 | (JP) | 9-87003 |
| Apr. 21, 1997 | (JP) | 9-103461 |
| Jan. 5, 1998 | (JP) | 10-197 |

(51) Int. Cl.[7] .................................................. G05B 17/00
(52) U.S. Cl. .................... 65/29.11; 65/29.19; 65/104; 65/107; 65/160; 65/162; 65/273
(58) Field of Search .................... 65/29.1, 29.11, 65/29.19, 102, 104, 106, 107, 117, 118, 119, 273, DIG. 13, 160, 162

(56) References Cited

U.S. PATENT DOCUMENTS

| 4,497,645 | 2/1985 | Peltonen . |
| 5,114,454 | 5/1992 | Promper et al. . |
| 5,173,102 | 12/1992 | Weber et al. . |
| 5,470,367 | 11/1995 | Salonen et al. . |
| 5,501,717 | * 3/1996 | Vehmas et al. ......................... 65/104 |
| 5,656,052 | * 8/1997 | Boardman et al. . |
| 5,902,367 | * 5/1999 | Salonen ................................ 65/29.1 |

FOREIGN PATENT DOCUMENTS

| 58-12983 | 1/1983 | (JP) . |
| 4-74729 | 3/1992 | (JP) . |
| 6-510736 | 12/1994 | (JP) . |
| 7-10572 | 1/1995 | (JP) . |
| 7-53229 | 2/1995 | (JP) . |
| 93/6052 | * 4/1993 | (WO) . |

* cited by examiner

Primary Examiner—Sean Vincent
(74) Attorney, Agent, or Firm—Oblon, Spivak, McClelland, Maier & Neustadt, P.C.

(57) ABSTRACT

An apparatus for forming glass sheets is provided wherein in a furnace structure of a heating furnace where molds with glass sheets carried thereon are intermittently conveyed, the staying period in the heating zone just before an annealing zone is variable, and the annealing zone includes a lifting device to separate a mold from a conveying device. By such arrangement, glass sheets having different shapes can be successively produced with a period for job change being greatly shortened.

14 Claims, 14 Drawing Sheets

Fig. 3
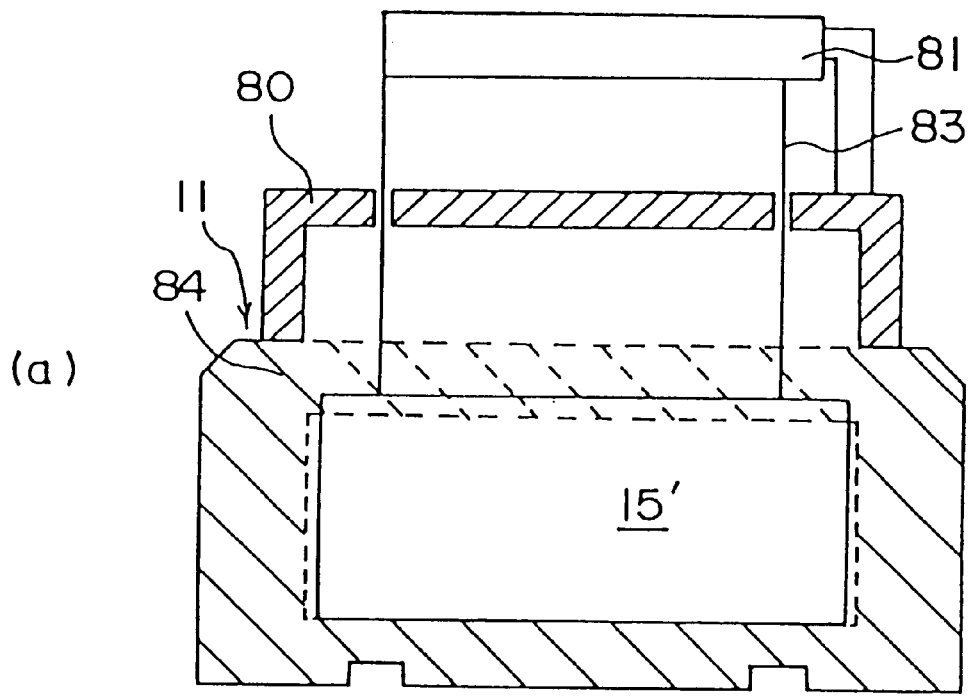
(a)
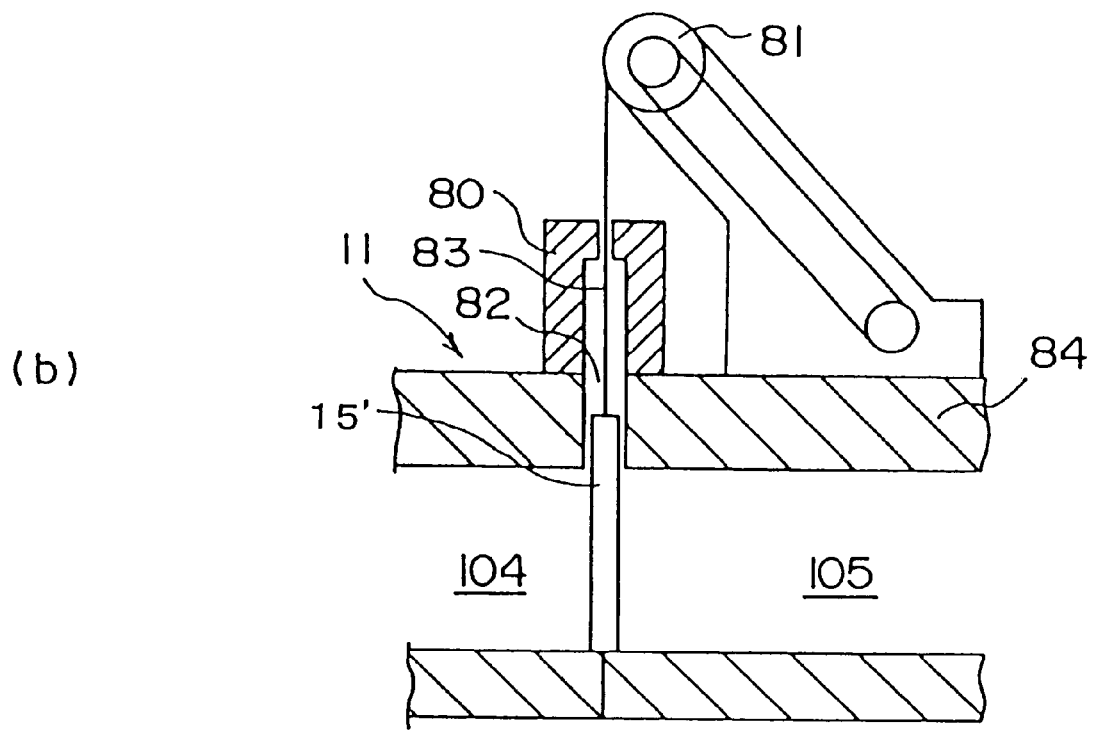
(b)

F I g. 8
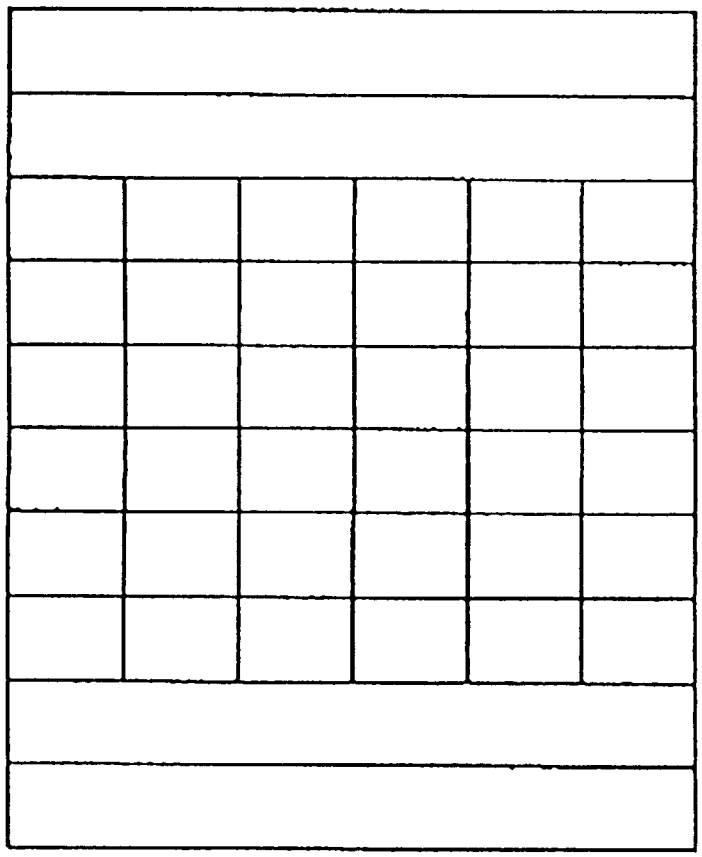
40 sections

GLASS PLATE BENDING METHOD AND APPARATUS

BACKGROUND OF THE INVENTION

1. Field of the Invention

The present invention relates to a method and apparatus for bending glass sheets.

2. Discussion of the Background

Glass sheets are heated to a bending temperature (normally around 600° C.–700° C.) to be formed into a bent shape from a flat shape. The forming can be carried out by several measures. As one example of the measures, there is a method wherein glass sheets carried on ring molds are conveyed into a heating furnace to sag under their own weight so as to be bent, following the profile of the molds (hereinbelow, referred to as the gravity using bending method).

EP-A-621244 contains a reference to a forming apparatus with the gravity using bent method applied thereto. The forming apparatus for glass sheets controls a conveyance commencing position of molds in a heating furnace into an annealing zone when glass sheets are conveyed into the annealing zone provided subsequently to the heating furnace. Such control can adjust the degree of deformation of the glass sheets between the heating furnace and the annealing zone and provide the glass sheets with a certain bent shape.

On the other hand, the bent shapes of glass sheets for automobile windows are required to be suited to small-quantity of multi-product production in order to cope with the tendency that automobiles are manufactured in small-quantity of multi-product production. Since a heated and softened glass sheet follows the profile of its related mold, the bent shape of each glass sheet is changed by changing its related mold. The glass sheets are deformed even when the glass sheets are conveyed from the heating furnace into the annealing zone. This means that the shape of each glass sheet can be also changed by modifying the conveyance commencing position that each of the glass sheets starts moving toward the annealing zone in the heating furnace and thereby modifying the period wherein each of the glass sheet is moving.

However, in order to use the apparatus disclosed in the publication to cope with the demand for small-quantity of multi-product production, the conveyance commencing position of the molds from the heating furnace into the annealing zone is required to be modified, depending on a desired shape of the glass sheets. Modifying the conveyance commencing position as required involves complication in the driving device for the modification. In addition, since the glass sheets are successively conveyed into the heating furnace, a preceding glass sheet interferes with the moving of the succeeding glass sheet if the conveyance commencing position is modified for each of the glass sheets. In case of the apparatus and the method disclosed in the publication, it has been difficult to cope with frequent modification of the shape of the glass sheets, which are required for the small-quantity of multi-product production of the glass sheets.

The heating temperature in the heating furnace for bending the glass sheets has been experientially set based on a targeted degree of curvature of the glass sheets. Before bending glass sheets in mass-production, sample glass sheets are formed in a bent shape in the heating furnace, and the bent shape of the formed sample glass sheets is compared to a targeted degree of curvature. When the bent shape is out of an acceptable range, the heating temperature is modified by feedback.

Such method for bending glass sheets requires to check on an actual apparatus whether the bent shape of glass sheets is in the acceptable range since the heating temperature in the heating zone has been experientially set. The conventional method for bending glass sheets has a disadvantage in that considerable labor is involved until glass sheets are actually mass-produced. In particular, unlimited considerable labor is involved to cope with the small-quantity of multi-product production since checking on an actual apparatus is required for each of targeted shapes. It takes a lot of time to change the shape of the glass sheets to another one (job change).

SUMMARY OF THE INVENTION

It is an object of the present invention to solve the disadvantage of the conventional technique, and to provide a novel method and apparatus for bending glass sheets which have not been known.

The present invention has been provided to solve the problem, and provides a method for bending glass sheets wherein a plurality of molds are provided, the respective molds have glass sheets carried thereon and the molds are successively conveyed into a heating furnace to bend the glass sheets; and wherein the heating furnace includes a plurality of divided heating zones which heat the glass sheets to a forming temperature and an annealing zone which is provided downstream of the heating zones to anneal the glass sheets, and the molds are successively conveyed into the heating furnace from upstream of the heating zones to downstream of the annealing zone through the divided heating zones and the annealing zone to bend the glass sheets, following the molds, so as to successively bend the glass sheets; characterized in that the molds are intermittently conveyed between the respective heating zones such that the molds stay for a certain period $T_0$ in the respective heating zones except the heating zone thereamong just before the annealing zone; and that a period $T_1$ wherein the molds stay in the heating zone just before the annealing zone is variable to not longer than $T_0$, and the molds are intermittently conveyed between the heating zone and the annealing zone such that the molds stay for the period $T_1$ dependent on a targeted curvature of the glass sheets.

The present invention also provides a method for bending glass sheets wherein a plurality of molds are provided, the respective molds have glass sheets carried thereon and the molds are successively conveyed into a heating furnace to bend the glass sheets; and wherein the heating furnace includes a plurality of divided heating zones which heat the glass sheets to a forming temperature and an annealing zone which is provided downstream of the heating zones to anneal the glass sheets, and the molds are successively conveyed into the heating furnace from upstream of the heating zones to downstream of the annealing zone through the divided heating zones and the annealing zone to bend the glass sheets, following the molds; characterized in that before conveying the glass sheets into the heating furnace to actually bend the glass sheets, a simulated shape of a glass sheet is found by calculating a degree of curvature of a glass sheet in its entirety in accordance with a method for calculating a degree of curvature of the glass sheet including a first step for setting dimensions of the glass sheet and preset temperatures of heaters provided in the respective heating zones, a second step for dividing the glass sheet into a plurality of elements and calculating a glass temperature in each of the elements in the respective heating zones based on a heating quantity received by each of the elements in the respective heating zones and a staying period of the glass sheet elements in the respective heating zones, a third step for calculating a degree of sag of each of the elements of the glass sheet in the respective heating zones based on the calculated glass temperature in each of the elements in the respective heating zones in consideration of a relationship between sagging speeds and glass temperatures of the glass sheet preliminarily found and a fourth step for calculating a degree of curvature of the entire glass sheet conveyed through the entire heating zones based on the calculated degree of sag of each of the elements of the glass sheet in the respective heating zones; and that the simulated shape of the glass sheet is compared to a preset desired design shape of the glass sheet and set temperatures of the heaters are determined by modifying the preset temperatures of the respective heaters so as to bring the simulated shape of the glass sheet near to the desired design shape, and that the molds with the respective glass sheets carried thereon are conveyed through the respective heating zones.

The present invention also provides an apparatus for bending glass sheets which includes a plurality of molds with glass sheets carried thereon, a heating furnace which includes a plurality of divided heating zones to heat the glass sheets to a forming temperature and an annealing zone provided downstream of the heating zones to anneal the glass sheets, and a conveying device to convey the molds from upstream of the heating zones to downstream of the annealing zone through the divided heating zones and the annealing zone, and which successively conveys the molds into the heating furnace to bend the glass sheets so as to follow the molds; characterized in that the molds are intermittently conveyed between the heating zones and between the heating zones and the annealing zone, that the molds stay for a certain period $T_0$ in the respective heating zones except the heating zone thereamong just before the annealing zone, and that a period $T_1$ wherein the molds stay in the heating zone just before the annealing zone is variable to not longer than $T_0$.

BRIEF DESCRIPTION OF THE DRAWINGS

FIG. 3 is a schematic cross-sectional front view (a) showing the details of a door and its surrounding in FIG. 1, and a schematic cross-sectional view (b) showing the details thereof.

FIG. 8 is a schematic view explaining block division based on the heater arrangement.

DETAILED DESCRIPTION OF THE PREFERRED EMBODIMENTS

Figure 1:
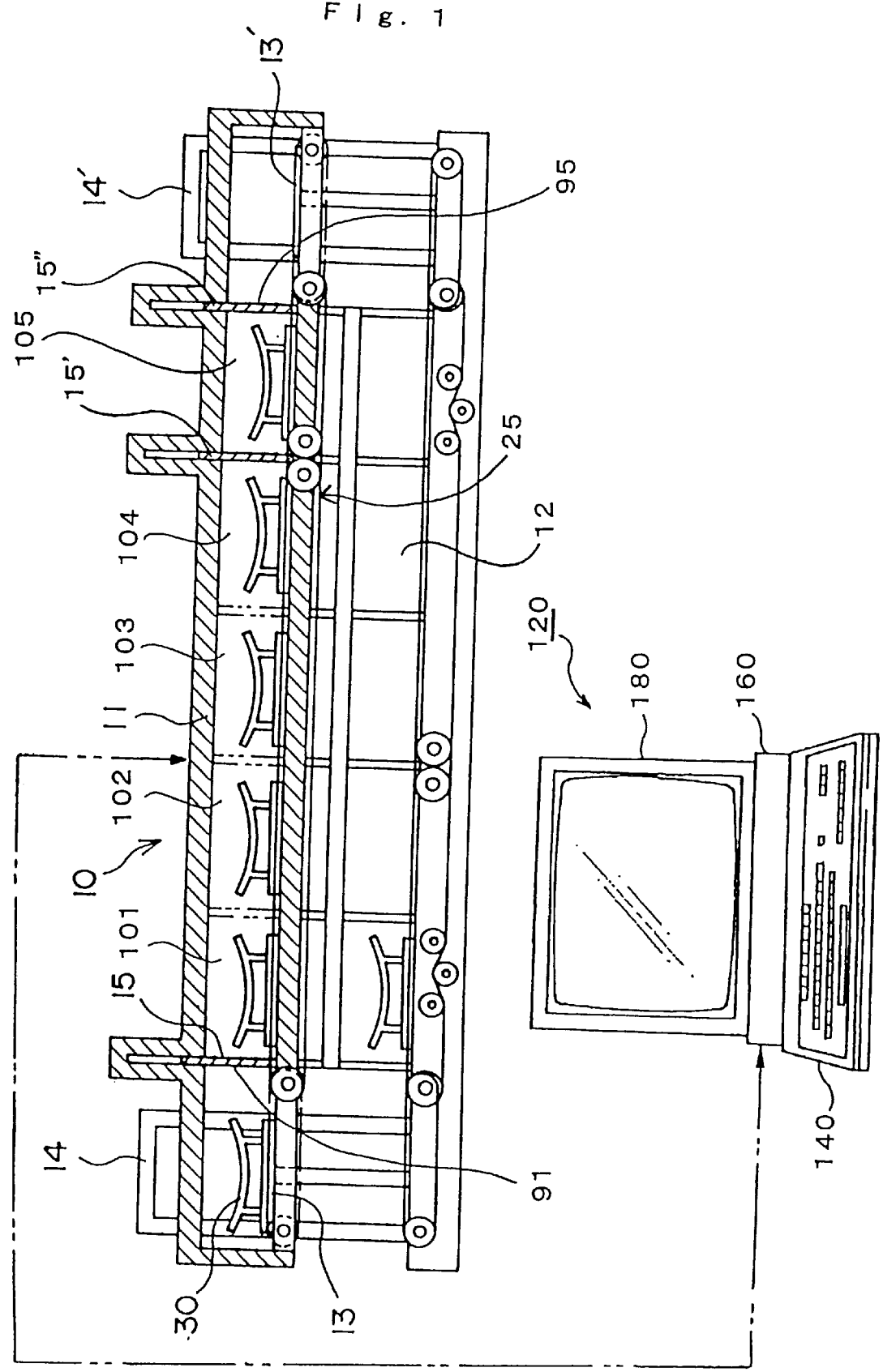
FIG. 1 is a schematic cross-sectional view of an example of the entire apparatus for forming glass sheet according to the present invention.

Now, the present invention will be described in reference to the accompanying drawings. In FIG. 1 is shown a schematic cross-sectional view of an example of the entire apparatus for forming glass sheets according to the present invention. A heating furnace to comprises a tunnel formed furnace structure 11 which has an inner wall provided with a plurality of heaters heated by energization to resistors, a mold returning zone 12 which is provided under the furnace structure 11, and vertical conveying zones 14, 14' which include lifters 13, 13' for conveying glass sheets between the furnace structure 11 and the mold returning zone 12.

The furnace structure 11 includes four divided heating zones 101–104 and an annealing zone 105, and the vertical conveying zones 14, 14' on an upstream side of the heating zone 101 and on a downstream side of the annealing zone 105. In the heating furnace 10, molds 30 with glass sheets carried thereon intermittently travel from the vertical conveying zone 14 toward the vertical conveying zone 14'. By such arrangement, the glass sheets are heated to be bent, following the profile of the molds 30. The molds 30 are ring formed molds, each of which has a contour substantially matched to a desired bent shape of the glass sheets, and each of which is formed in a downwardly convex shape. The glass sheets have peripheral portions thereof supported by the molds 30. The molds 30 are carried on a conveying device 25 comprising a driving chain, a conveyer belt and so on, and are intermittently traveled in each of the heating zones and the annealing zone in the furnace structure 11, driven by the conveying device 25. Each of the molds 30 normally has a glass sheet or two glass sheets carried thereon. In particular, the forming of glass sheets according to the present invention can be effective to bend two glass sheets to be used for laminated glass for a windshield. Laminated glass is prepared by laminating two glass sheets with an intermediate layer interposed therebetween. The bending shapes of the two glass sheets are required to conform each other. Matching of the bent shapes of both glass sheets can be obtained by putting the two glass sheets on a mold one on the other.

The respective molds 30 stay for a certain period $T_0$ in the heating zones 101–103 among the heating zones, which are located up to the third one from the vertical conveying zone 14. On the other hand, the staying period $T_1$ wherein the molds 30 stay in the heating zone 104 just before the annealing zone 105 is appropriately variable, depending on glass sheet types. Although the staying period is variable, $T_1$ is not longer than $T_0$. By such arrangement, the heating period is modified, depending on a targeted bending shape of the glass sheets. The glass sheets can be obtained to have a desired bent shape for each of glass sheet types by lengthening the staying period $T_1$ in the heating zone 104 for bending the glass sheets greatly (making the radius of curvature small) and shortening the staying period $T_1$ in the heating zone 104 for bending the glass sheet slightly (making the radius of curvature great).

The furnace structure 11 has certain positions thereof provided with doors 15, 15' and 15". Specifically, the doors 15, 15' and 15" are provided between the heating zone 101 and the vertical conveying zone 14 at a front end of the heating zone 101, between the heating zone 104 and the annealing zone 105 and between the annealing zone 105 and the vertical conveying zone 13' at a rear end of the annealing zone 105 to provide closed spaces in the furnace. The doors 15, 15' and 15" are opened only when the molds 30 pass thereat, and the doors are otherwise closed. The doors 15, 15' and 15" are vertically opened and closed, and the furnace structure has enclosures provided on an upper portion thereon so as to include guides for door opening. The provision of the doors prevents the temperature in the furnace from being removed out thereof. The enclosures will be explained in detail later.

The molds 30 with the glass sheets carried thereon are conveyed from an inlet of the furnace structure 11 into the furnace structure 11 by the lifter 13 in the vertical conveying zone 14. At that time, the door 15 which is provided at the front end of furnace structure 11 is opened, being matched to the progress of the molds 30. When each of the molds 30 has gotten in the furnace structure 11, the door 15 is closed. Only when each of the molds 30 is conveyed, the door 15 is opened to prevent the heat in the furnace structure 11 from escaping out of the furnace.

The molds 30 are conveyed until the heating zone 104 of the furnace structure 11 in that manner. When each of the molds moves into the annealing zone 105 after having been transferred into the heating zone 104, the door 15' which is provided between the annealing zone 105 and the heating zone 104 just therebefore is opened, being matched to the progress of each of the molds 30. The temperature in the annealing zone 105 is lower than that in the heating zone 104. The reason for provision of the door 15' is that the different temperatures in the respective adjoining zones are required to be maintained. There is also provided the door 15" between the annealing zone 105 and the vertical conveying zone 14' to maintain the temperature in the furnace structure 11. The door 15" is also opened only when each of the molds 30 is removed from the annealing zone 105 to the vertical conveying zone 14'.

The glass sheets which have been bent in that manner and have been conveyed to the vertical conveying zone 14' are downwardly moved by the lifter 13', being carried on the molds 30. After that, only the glass sheets are conveyed into a subsequent process, and the molds 30 are conveyed to the vertical conveying zone 14 through the mold returning zone 12.

The heating furnace has upper, lower, right and left walls provided with heaters, which heat the inside of the heating zones 101–104 to such a temperature that the glass sheets can be heated and softened to be deformed in a bent shape. The heaters in the annealing zone 105 heat the inside of the annealing zone 105 to such a certain temperature that the glass sheets heated in the heating zones 101–104 can be annealed. After the glass sheet have stayed in the annealing zone 105 for a certain period, the glass sheets are conveyed from the annealing zone 105 outside the furnace structure 11, driven by a conveying device 25.

As stated, there are provided a plural number of the molds 30 to be conveyed, and the glass sheets are successively conveyed into the heating furnace 10, being carried on the molds. The molds 30 are successively conveyed so that each of the molds stays in each of zones in the furnace structure 11 in principle. Although a zone contains no mold 30 in an exceptional case, there is no case that a zone contains a plural number of the molds 30. When the molds 30 have stayed in the respective heating zones 101–103 for the certain period $T_0$, the molds 30 are successively conveyed to the subsequent zones. At that time, another mold 30 outside the furnace structure 11 is conveyed into the heating zone 101. After that, subsequent molds 30 are successively conveyed into the heating zone. The molds 30 in the heating zone 104 and the annealing zone 105 do not always stay there for a certain period (the stay period $T_1$ at the heating zone 104 is variable to not longer than $T_0$ as explained. The staying state in the annealing zone will be explained). The respective molds 30 in the heating zone 104 and the annealing zone are, however, successively conveyed in the subsequent zones like the molds 30 in the other zones.

Each of the molds 30 stays for the period $T_0$ in each of the heating zones 101–103 of FIG. 1. On the other hand, the staying period $T_1$ of each of the molds 30 in the heating zone 104 has a maximum value of $T_0$, and the staying period $T_1$ is shortened depending on a desired bent shape of the glass sheets. When a mold is conveyed from the heating zone 104 into the annealing zone 105 under $T_1<T_0$, there is a situation where the heating zone 104 contains no mold 30. A mold 30 is conveyed from the heating zone 103 into the heating zone 104 when a period of $(T_0-T_1)=T_2$ has passed after lapse of $T_1$. Since the conveying device for this conveyance is driven, the conveying device in the heating zone 104 without a mold contained therein is also driven. In addition, the conveying device in the annealing zone 105 is also driven. Without adopting any measures, the glass sheet or the glass sheets on the preceding mold 30 which has been conveyed into the annealing zone 105 are not subjected to sufficient annealing since the annealing period is only $T_2$.

Figure 2:
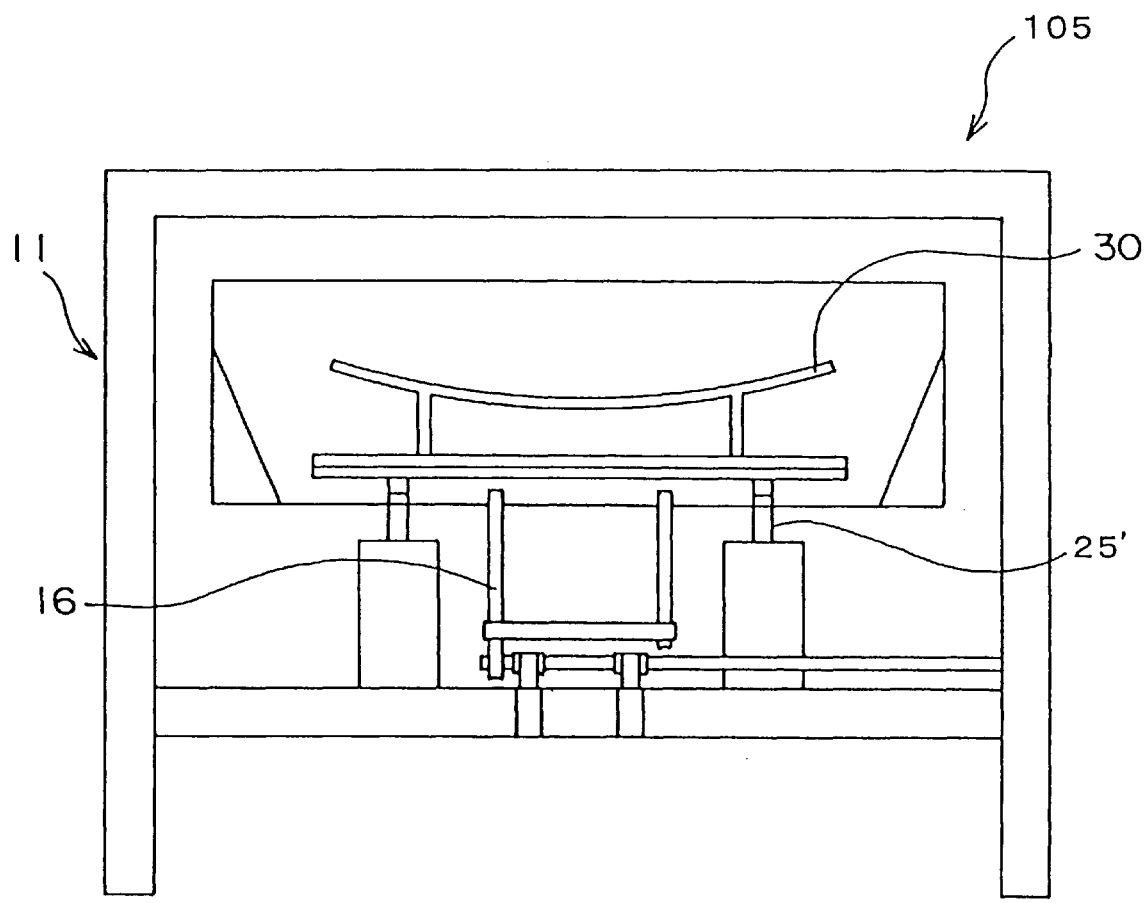
FIG. 2 is a schematic front view of an example of the annealing zone in FIG. 1.

There may be provided an arrangement that prevents such interlocking operation. In FIG. 2 is shown a device which has a simpler structure than such an arrangement. Specifically, it is preferable that the annealing zone 105 include a lifting device 16 which can temporarily prevent the motion of the conveyed device 25' from being transmitted to the mold 30 in that zone. When the glass sheets are bent in a certain type, the molds 30 in the heating zones 101–103 stay therein for the period of $T_0$. At that time, the mold in the heating zone 104 stays therein for the period of $T_1$. The mold in the heating zone 104 is conveyed into the annealing zone after lapse of the period of $T_1$. Under $T_1<T_0$, the molds in the heating zones 101–103 still stay therein.

After the period $T_2$ has passed since then, the respective molds 30 in the heating zones 101–103 are conveyed to the respective subsequent heating zones. At that time, the glass sheet in the annealing zone 105 has been subjected to annealing only for the period of $T_2$. In order to cope with this problem, the mold 30 in the annealing zone is lifted from the conveying device 25' by the lifting device 16 to prevent the glass sheet in the annealing zone 105 from being conveyed out of the furnace structure 11, driven by the conveying device. Such arrangement allows the conveying device 25' and the mold 30 to be separated so as to prevent the motion of the conveying device 25' from being transmitting to the mold 30. After that, the mold 30 separated from the conveying device 25' is put on the conveying device 25' while the motion of the conveying device 25' is stopped, and the motion of the conveying device 25' is transmitted to the mold 30 when the mold 30 is conveyed from the annealing zone 105 to the furnace structure 11.

When the subsequent mold 30 in the heating zone 104 is conveyed into the annealing zone 105, the mold 30 in the annealing zone 105 is conveyed outside the furnace structure 11 (the lifting zone) by the conveying device 25'. After that, the mold 30 in the lifting zone 14' is downwardly conveyed below the furnace structure 11 by the lifter, and the formed glass sheet is conveyed toward a direction opposite to the mold returning zone 12. The mold 30 is transferred toward the lifting zone 14 just before the heating zone 105 through the mold returning zone 12, and a new glass sheet is put on the mold therein.

The conveying devices according to the present invention may comprise any preferred device that can intermittently convey molds put thereon from the respective zones to the subsequent zones, such as a device wherein a driving chain, belt or roller coupled to a driving device of e.g. an electric motor is driven. Although the conveying device which are located to correspond to the heating zones 101, 102 and 103 may be simultaneously driven by a single endless belt or driving chain, the conveying device which is located to correspond to the heating zone 104 driven independently of the motion in the heating zone 101 and so on. Since a mold is conveyed from the heating zone 103 to the heating zone 104, the conveying device in the heating zone 104 is also activated, following the motion of the mold which has stayed in the heating zone 103. This is also applied to the annealing zone 105.

In the heating zones and the annealing zone, the furnace wall which includes heat insulating materials has the plural heaters provided thereon to heat the respective zones to certain temperatures. In the shown example, the furnace structure has the ceiling wall provided with five heaters in each of the zones, the side wall provided with one heater in each of the zones and the floor wall provided with three heaters in each of the zones, and the present invention is not limited to the arrangement of the heaters in the shown example. Although there are the four divided heating zones, the present invention is not limited to such dividing arrangement, and the dividing arrangement may be appropriately modified, depending on the capacity of the heaters, the stay period and the installing location. It is preferable that the heating zones comprises about 4–7 of divided zones in order to change the temperature distribution of the heaters in each of the heating zones so as to obtain certain curvatures at respective portions of a glass sheet by giving different temperature distributions to the glass sheet.

The heating zones have the temperatures therein set, depending on a type of the glass sheets, so as to be normally heated to about 600° C.–about 750° C. The annealing zone has the temperature therein normally set at about 400° C.–about 450° C., depending on the temperature and the type of the heated glass sheets. Burner instead of the heaters may be provided to heat the inside of the zones. All heaters may be replaced by burners, and some of the heaters may be replaced by burners.

The lifting device which separates a mold from the conveying device and put it on the conveying device again in the annealing zone may comprise a proper device such as a device wherein pistons in the zone are vertically moved by e.g. pneumatic cylinders from outside the zone.

The forming apparatus for glass sheet according to the present invention is particularly effective when the staying period of the mold 30 in the heating zone 104 in the shown example is frequently modified. Modification in the staying period of the mold 30 in the heating zone 104 is made to successively produce glass sheets having different dimensions including a bent shape thereof. This is effective as measures to cope with small-quantity of multi-product production of glass sheets for automobile windows in terms of the recent trend toward small-quantity of multi-product production of automobiles. By modifying the stay period of the mold 30 in the heating zone 104, the time period to heat glass sheets can be modified to accordingly modify the curvature of the glass sheets, providing the glass sheets with many kinds of bent shapes. On other words, production of glass sheets in many kinds of types can be realized by setting the time period for heating, depending on the types of the glass sheets.

The modification in the time period for heating glass sheets in accordance with types thereof can be realized by modifying set temperatures of the heaters. When glass sheets having different types are successively produced, the staying period in the heating zone just before the annealing zone can be appropriately modified, depending on the types, in accordance with the forming apparatus of the present invention to obtain glass sheets bent so as to have various kinds of desired curvature. In particular, when a mold has conveyed into the annealing zone at earlier timing, the following arrangement stated earlier is preferably provided to obtain a sufficient annealing without provision of a complicated driving device. The provision of the lifting device in the annealing zone which temporarily lifts a mold from the conveying device to prevent the motion of the conveying device from being transmitted to the mold is preferable to actually realize the modification in the staying period in the heating zone referred to in this paragraph.

In order to cope with such small quantity of multi-product production, it is required that the temperatures in the respective heating zones be kept at set temperatures. The following arrangement can be listed as preferable arrangement to realize stable temperature setting.

(1)Enclosures are provided at the doors.

(2)The heaters for the ceiling wall are separated from the furnace wall.

The arrangement (1) will be explained. It has been described that the doors 15, 15' and 15" are provided on the certain positions of the furnace structure 11. It is preferable that the enclosures are provided on the furnace structure to prevent the temperature in the furnace from being removed outside the furnace when the doors are opened. The details of an enclosure and its surrounding are shown in FIG. 3.

In FIG. 3(a) is shown a schematic cross-sectional front view of essential portions of the enclosure and its surroundings, and in FIG. 3(b) is shown a schematic cross-sectional view of the essential portions. Although the opening and closing devices for the respective doors may comprise any preferred devices, the opening and closing devices for the respective doors in the shown example comprise devices having the same structure. In FIG. 3 is shown the device for the door 15' between the heating zone 104 and the annealing zone 105 as a typical example.

The heating zone 104 and the annealing zone 105 have a boundary therebetween provided with the door 15'. The upper furnace wall 84 has a door entry opening 82 formed therein at the boundary between the heating zone 104 and the annealing zone 105 to communicate between the inside of the heating furnace and the inside in the enclosure 80 so that the door 15' is vertically movable. The enclosure 80 is formed in a vertically extended box shape which has an enclosure opening toward the door entry opening 82. The enclosure opening has an opening end portion thereof abutted to an outer surface of the furnace wall 84 through heat insulating material so as to contain the door entry opening 82 in an inner periphery of the enclosure opening. When the door 15' is opened, the door 15' is housed in the box.

The enclosure 80 is abutted to the outer surface of the furnace wall 84 through heat insulating material and is bolted to the furnace wall 84 at brackets thereof (not shown). The heat insulating material which is interposed between the enclosure 80 and the furnace wall 84 works as a heat seal for the abutting portion of both members. The enclosure 80 is made of boards with heat insulating material included therein.

The door 15' has an upper portion thereon coupled to a driving device 81 through coupling members 83 such as chains and wires. The door is vertically moved, driven by the driving device 81, to open and shut the communication between the heating zone 104 and the annealing zone 105. Although the driving device 81 may comprise any preferred device, the shown example adopts such arrangement that sprocket is rotated, using a pneumatic cylinder as a driving source, to wind and unwind the coupling members, opening and closing the door 15'.

The provision of the doors is effective to maintain the inside of the heating furnace at the certain temperature in stable fashion. In particular, the door 15' which is provided between the heating zone 104 and the annealing zone 105 is effective to maintain the inside of the heating furnace at the certain temperature. In order to control the stress exerted on the glass sheets, the glass sheets are required to be adequately annealed. For this reason, it is necessary to maintain the temperature in the annealing zone at a certain temperature. On the other hand, when the heat in the heating zone is conducted to the inside of the annealing zone adjacent the heating zone, the temperature in the annealing zone can not be kept at the certain temperature.

From this viewpoint, it is effective that a door provided between the heating zone and the annealing zone to shut the communication therebetween and that the door is opened and closed (when a mold is conveyed) as in the shown example. In order to keep the inside of the annealing zone at a certain temperature, it is particularly effective to interlock the motion of the door opening device with the motion of the conveying device for a mold so that the door is opened and closed, matching timing to convey the mold from the heating zone into the annealing zone. This interlock greatly contributes to maintain the inside of the annealing zone at a certain temperature in an apparatus which is particularly effective to cope with small-quantity of multi-product production of glass sheets wherein the staying period in the heating zone 104 changes as it fits.

Figure 4:
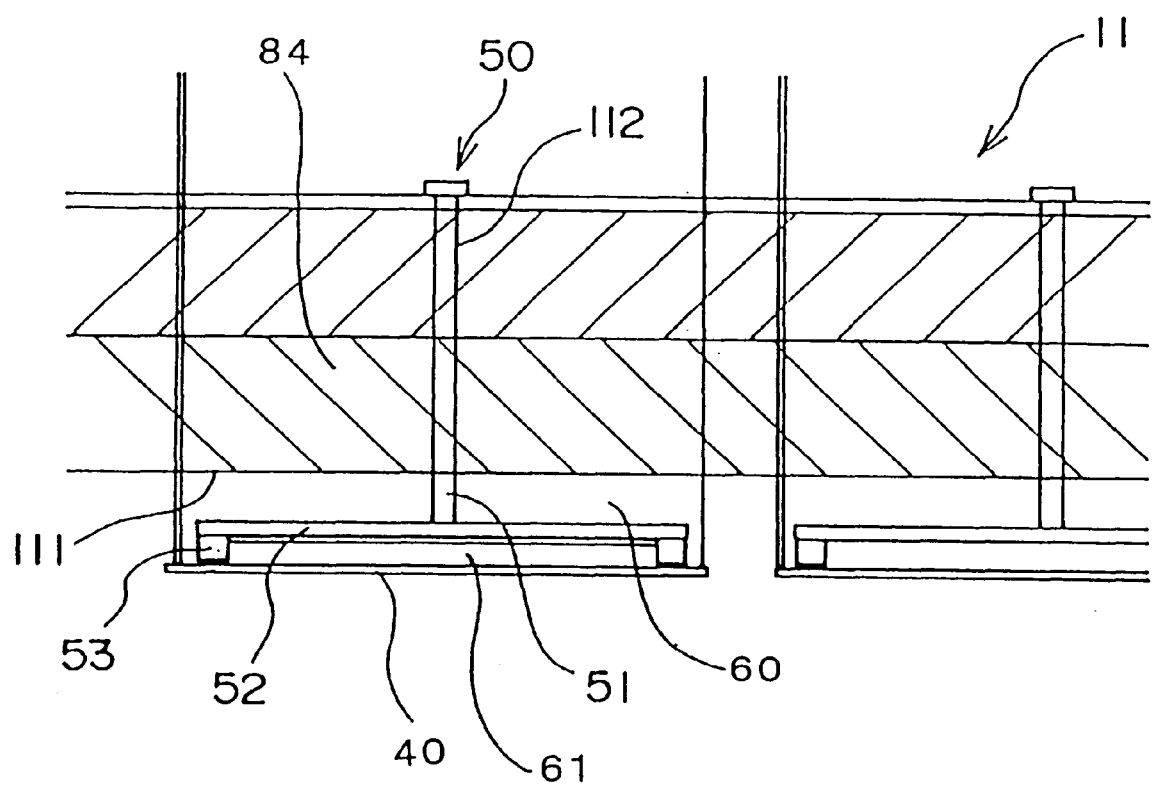
FIG. 4 is a schematic cross-sectional partial view of an upper portion of the furnace structure in FIG. 1.

The separation of the heaters for the ceiling wall from the furnace wall in the arrangement of (2) will be explained. In FIG. 4 is shown a schematic cross-sectional partial view of the upper portion of the furnace structure 11, which is viewed from the same side as FIG. 1. The heaters 20 have a flat shape, and a certain number of the heaters are provided in each of the heating zones. In FIG. 4 are shown one of the heaters and another heater adjacent thereto in the conveying direction. The heaters are suspended from the ceiling wall by supporting members 50 so as to provide a first air layer 60 between an inner surface 111 of the furnace wall 84 and the heaters 20. Each of the supporting members 50 comprises a suspending member 51 passed through a through hole 112 formed in the furnace wall 84 and held on the outer surface of the furnace wall 84, a supporting plate 52 fixed to the suspending member 51 by e.g. screws, and spacers 53 made of glass. The supporting plate 52 is made of heat insulating material for instance, and the supporting plate is fixedly suspended from the suspending member 51 to be separated from the inner surface 111 of the furnace wall 84. The space between the supporting plate 52 and the inner surface of the furnace wall 84 substantially works as the first air layer 60. Each of the heaters 20 and each of their related supporting plates 52 have the spacers 53 interposed at peripheral portions thereof therebetween so as to provide a second air layer 61 therebetween. Each of the heaters 20 has both ends provided with conductive terminals for energization, which pass through holes in the furnace wall 84 and connected to a power source outside the furnace.

The reason why such arrangement of the heaters is effective in small-quantity of multi-product production for glass sheets is as follows. When a glass sheet has different curvatures at portions thereof, a temperature distribution is given to the glass sheet to be heated in the heating furnace. Various patterns can be provided with the temperature distribution to obtain glass sheets having many different bent shapes. In other words, production of glass sheets in many different types can be realized by giving a temperature distribution suited to each of the different types. In order to provide a temperature distribution suited to each of the different types, temperature setting for the heaters is modified for each of the different types.

When glass sheets which have different dimensions including bent shapes are successively produced, the temperature setting for the heaters provided on the inner surface of the furnace wall is frequently modified. When the heaters are embedded in the furnace wall as usual, the heat is taken in the furnace wall or the heat in the furnace wall is taken out even if temperature setting for the heaters is modified. This creates a phenomenon that the inside of the furnace can not be set at a certain temperature or a phenomenon that it takes some time for the inside of the furnace to be set at a certain temperature because of poor responsivity. The arrangement of the heaters as stated earlier provides the first and second air layers between the inner surface of the furnace wall and the heaters. This allows the temperature in the furnace to be modified with good responsivity in accordance with modification in the temperature setting for heaters, modifying the temperature of the glass sheets.

Now, a preferred mode for setting and controlling the temperature of the heaters will be explained. The usefulness of temperature distributions in accordance with different types has been stated. If a fine temperature distribution is provided, diversification in the shape of the glass sheets is accordingly realized. In order to provide such a fine distribution, it is proposed that the heaters be subdivided. However, if the heaters are subdivided, the temperature control system for the heaters is accordingly complicated. Now, a preferred mode to simplify the temperature control system will be explained.

Figure 5:
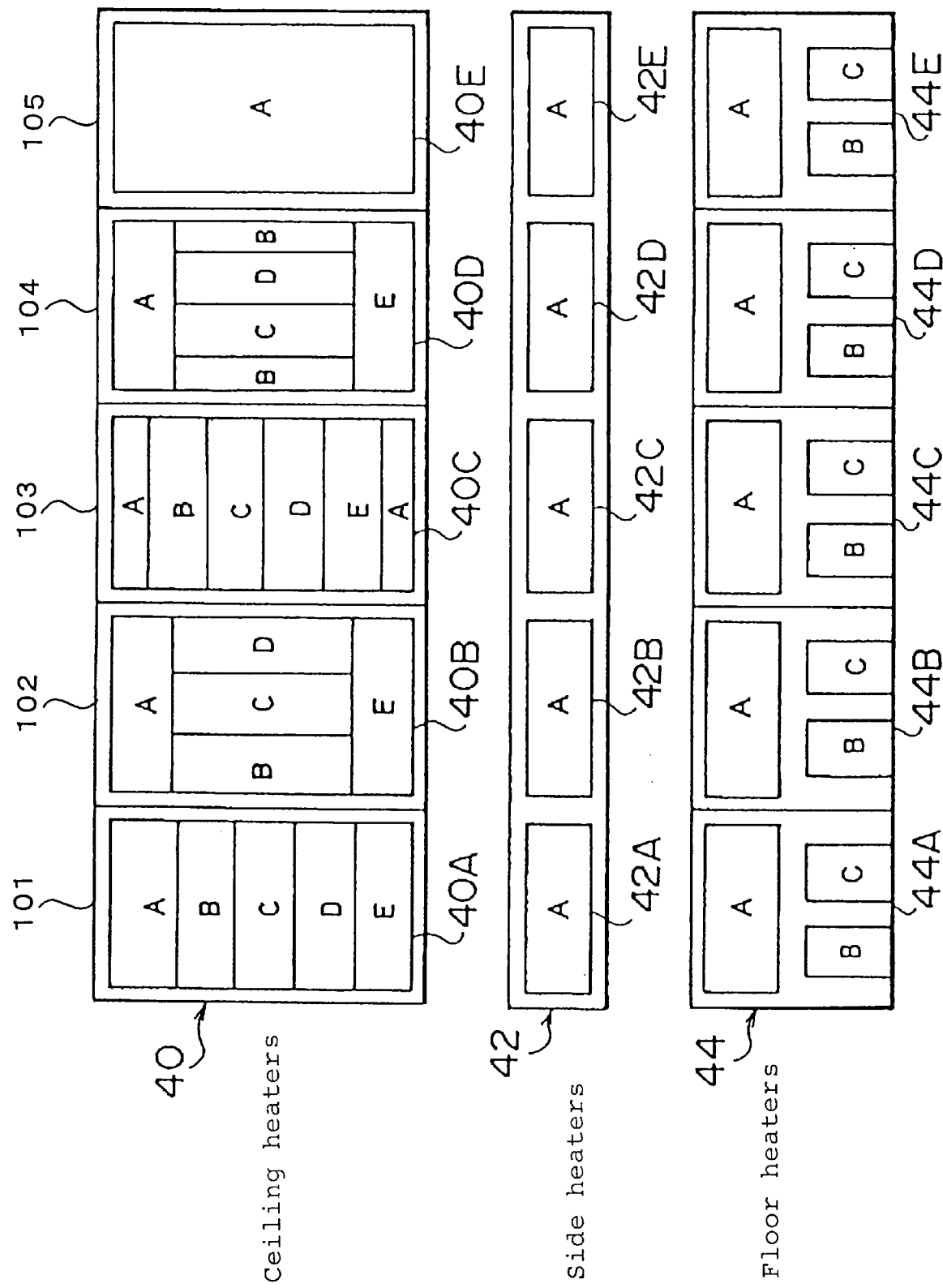
FIG. 5 is a layout diagram of heaters provided in the respective zones in FIG. 1.

In FIG. 5 is shown an arrangement of the heaters which are provided in the heating zones 101–104 and the annealing zone 105. Each of the zones includes ceiling heaters 40, side heaters 42 and floor heaters 44. The ceiling heaters 40A–40D in each of the respective heating zones include five divided heater groups A–E, and the respective ceiling heaters have different arrangement patterns. In particular, the ceiling heaters 40C and D in the heating zones 103 and 104 have the heater groups A and B divided into two blocks. Consequently, each of the heating zones 103 and 104 includes six blocks. The heating group A of the ceiling heater 40E in the annealing zone 105 is made of a single heater, which is set at a lower temperature than the heater groups in the other zones. The respective heater groups in the respective zones are set at independent temperatures.

Each of the side heaters 42A–42E in each of the heating zones is made of a single heater A, and each of the side heaters has the same arrangement pattern as one another. The floor heaters 44A–44E in the respective heating zones are divided into three heaters A–C, and the floor heaters have the same arrangement pattern.

Figure 6:
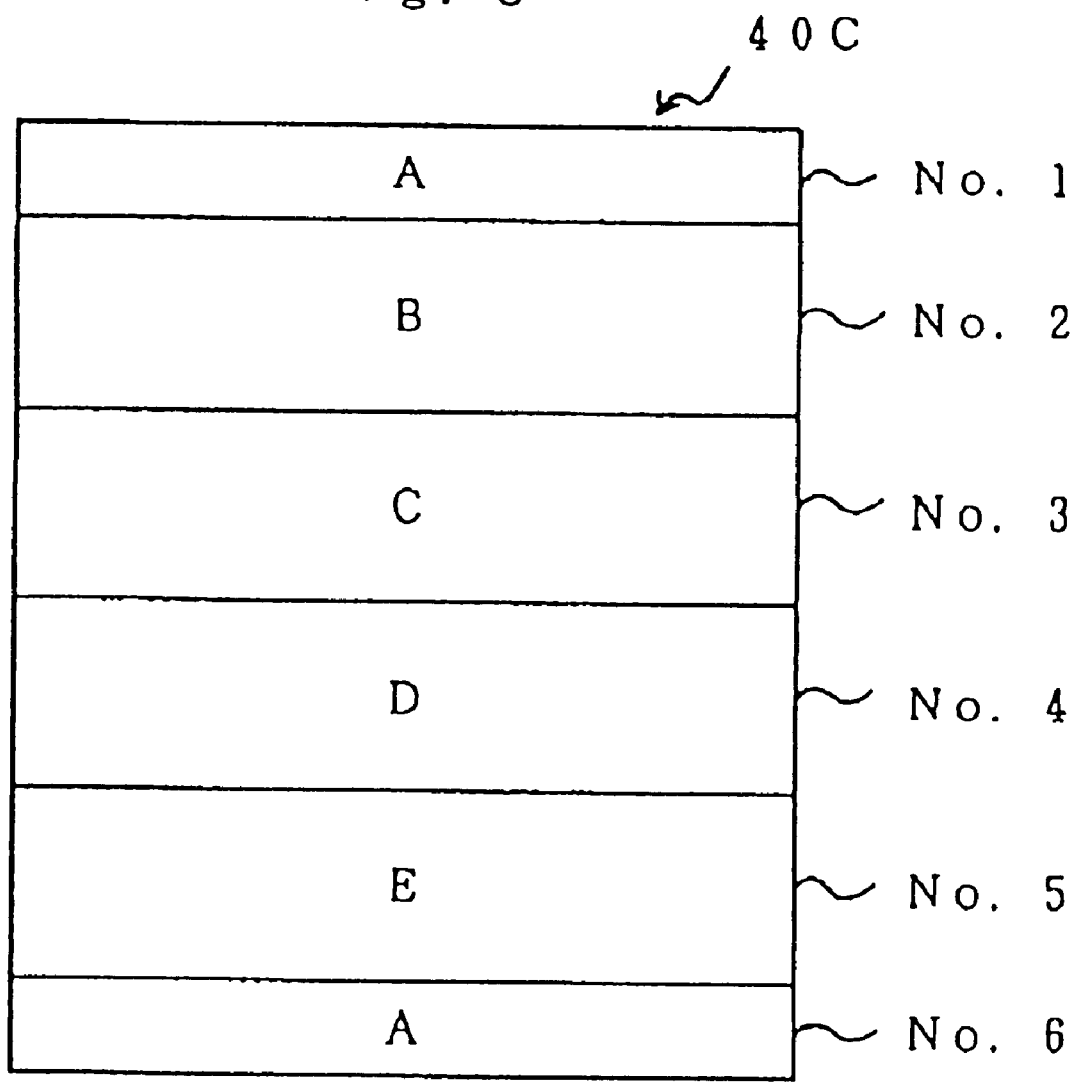
FIG. 6 is a schematic view of the arrangement of ceiling heaters in the heating zone 103 in FIG. 1.

Control for the ceiling heaters will be described with respect to the ceiling heaters 40C as an typical example (in FIG. 6 is shown an enlarged view of the ceiling heaters 40C). As stated earlier, the ceiling heaters 40C are divided into six blocks numbered No.1–No.6. In FIG. 6, the ceiling heaters include the heater group A, the heater group B, the heater group C, the heater group D, the heater group E, the heater group A from the top. In other words, the ceiling heaters 40C include the two heater groups A, A set at the same temperature, and each of these heater groups A, A is made of heating elements, the number of which is half of the number of the heating elements in each of the other heater groups B–E.

Figure 7:
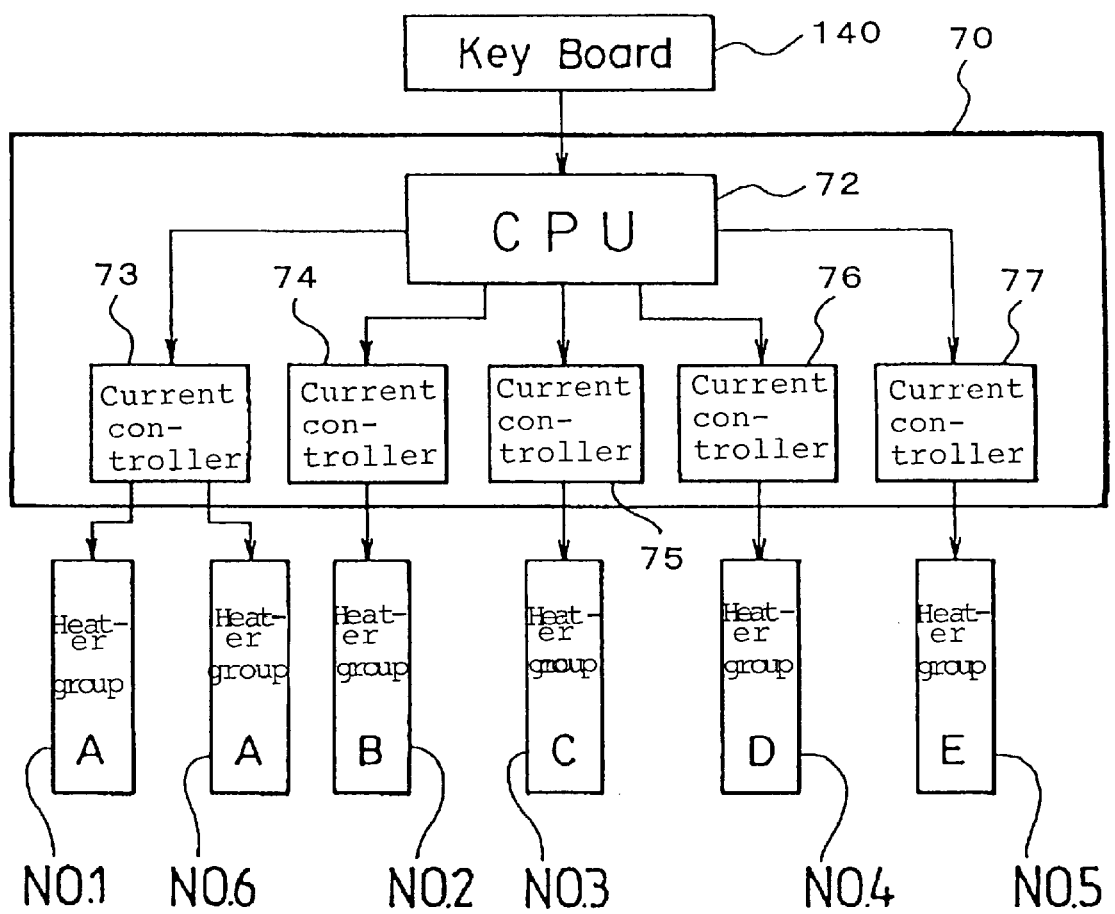
FIG. 7 is a block diagram of a heating temperature controller for ceiling heaters.

In FIG. 7 is shown in a block diagram of a heating temperature controller 70 for the ceiling heaters 40C. The heating temperature controller 40 shown in this Figure includes CPU 72 for collectively controlling the ceiling heaters 40C. The CPU 72 controls five current controllers (five temperature control systems) 73, 74, 75, 76 and 77 based on inputted information to heat each of the heater groups A–E to certain temperatures set through a keyboard 140. By such arrangement, a certain temperature distribution for bending the glass sheets is provided in the heating zone 103.

The current controller 73 is a temperature control system for heating the heater groups A to heat the heater groups A, A numbered No.1 and No.6, the current controller 74 is a temperature control system for the heater group B, the current controller 75 is a temperature control system for the heater group C, the current control system 76 is a temperature control system for the heater group D, and the current controller 77 is a temperature control system for the heater group E. In the heating temperature controller 70 shown in FIG. 7, the two heater groups A, A which are set at the same temperature are controlled by the single current controller 73.

In accordance with the heating temperature controller 70 thus constructed, it is enough to provide the five current controllers 73–77 for the heater groups A–E divided into six blocks. By such arrangement, a temperature distribution with fine temperature differences can be provided without increasing the number of the current controllers to correspond to the number of the heater groups, and the glass sheets can be bent in a shape close to designed dimensions.

Although explanation has been made with respect to the heating temperature controller 70 for the ceiling heaters 40C in the heating zone 103, the ceiling heaters 40D in another zone may be likewise temperature-controlled. The ceiling heaters 40D shown in FIG. 5 include two divided heater groups B. B set at the same temperature, and the heater groups B, B are shown to be temperature-controlled by a single current controller.

The ceiling heaters 40A, 40C provided in the heating zones 101, 103 shown in FIG. 5 have the same number of control systems though the ceiling heaters have different arrangement patterns of the heater groups thereof. Likewise the ceiling heaters 40B, 40D provided in the heating zones 102, 104 have the same number of control systems though the ceiling heaters have different arrangement patterns of the heater groups thereof. By intermittently conveying glass sheets through the respective heating zones with different arrangement patterns of heater groups as stated, the distribution of heat quantity received from the heating zones by the glass sheets can be finely divided without increasing the number of the temperature control systems. Specifically, the distribution of the received heat quantity can be divided into 40 divisions on a surface of a glass sheet as shown in FIG. 8 (the divisions of the heater groups in the respective heating zones can be overlaid to provide the 40 divisions in FIG. 8) In this manner, a fine temperature distribution can be produced without increasing the number of the control systems. As a result, it is possible to bend the glass sheets in a fine shape in an economical way.

The glass sheets are carried on the mold in the heating furnace, and the glass sheets are bent under their own weight so as to follow the profile of the molds. Not only curvatures with finely divided into the 40 divisions can be given to the glass sheets but also a fine temperature distribution can be synergistically given to the glass sheets by applying various kinds of temperature hysteresis to respective portions of the glass sheets, such as a control wherein the temperatures in the respective heating zones are controlled so that the glass sheets have a portion thereof abutted on the related molds and a peripheral portion of the abutted portion provided with increased temperatures faster than the other portions, a control wherein the glass sheets have a portion away from the abutted portion provided with an increased temperature faster than the other portions, and a control wherein a temperature is gradually increased or rapidly increased after the temperature has been increased to a certain level.

When the heaters are provided on the floor wall or the side walls, it is preferable that these heaters are separated from the inner surface of the furnace. Since the glass sheets are put on the molds, the temperature control on a lower side of the glass sheets must be made, considering the existence of the molds, in some cases. On the other hand, the set temperatures and the temperature distribution of the heaters can be more precisely reflected on an upper side of the glass sheets since there is no obstacle between the heaters and the upper side of the glass sheets. It is desirable that the heaters provided on the ceiling of the furnace can set temperatures with better precision than the heaters provided on the floor of the furnace. From this viewpoint, it is recommended that at least the heaters on the ceiling have a good responsivility to the temperature of the glass sheets in terms of temperature setting, and it is preferable that there is provided the air layer between the heaters on the ceiling and the inner surface of the ceiling of the furnace as in the example.

A preferred bending control for glass sheets in accordance with the synergistic fine temperature distribution stated above will be now described.. Specifically, a simulation finding program which is installed in a computer mainframe 160 shown in FIG. 1 will be explained. This is a technique capable of setting heater temperatures in a simple way, in particular, for small-quantity of multi-product production, which is different from the conventional technique wherein the heater temperatures in the heating zones are experientially set and it is checked on an actual apparatus whether the bent shape of a glass sheet is in an acceptable range. The technique according to the present invention is one that for finding the temperatures of a glass sheet and the degrees of sag in the glass sheet in the respective zones, the accuracy in simulated results is upgraded in consideration of the temperatures of the glass sheet and the sagging speed in the glass sheet in the preceding zones.

In FIG. 1 is shown a computer 120 which collectively controls the heating furnace 10. The computer 120 has the keyboard 140 for setting heater temperatures in the respective heating zones of the heating furnace 10 and for inputting conditions for a glass sheet to be bent, the computer mainframe having the simulation finding program installed therein to find degrees of curvature in the glass sheet, and a display 180 for displaying calculated results, and various functions and operational status of the heating furnace 10. The heating furnace 10 and the computer 120 can be connected so as to exchange various data therebetween, and the heaters in the respective heating zones are temperature-controlled based on the heater temperatures inputted through the keyboard 140. Information on actual temperatures of these heaters is transmitted to the display 180 to be displayed thereon.

Figure 9:
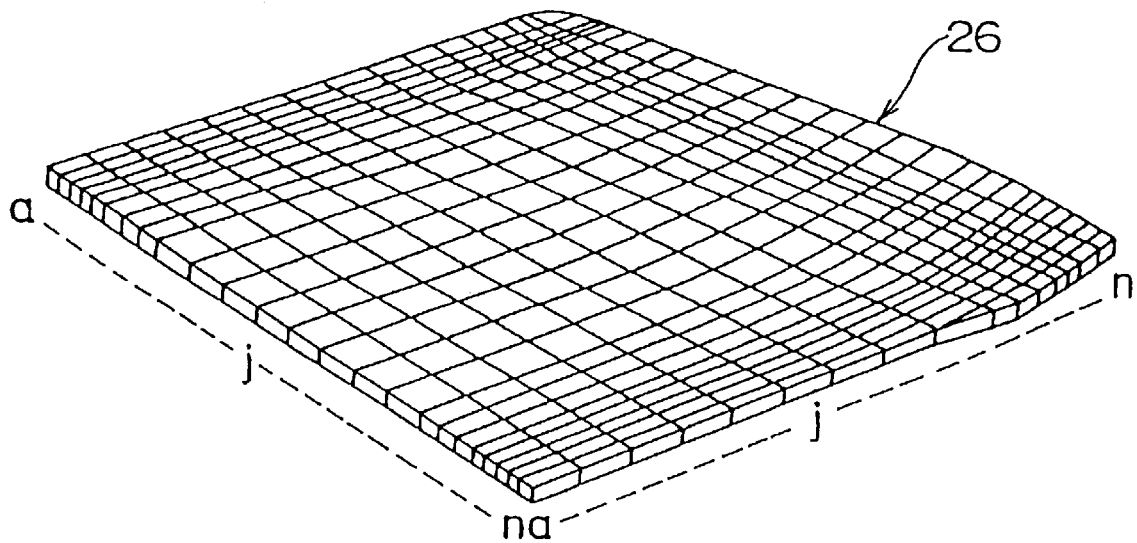
FIG. 9 is a model view of a glass sheet for explanation of the simulation according to the present invention.

The program divides a glass sheet 26 into a plurality of elements (n×n) as shown in FIG. 9 when a desired size and thickness of the glass sheet 26 and heater temperatures in the respective zones are inputted through the keyboard 140.

Figure 10:
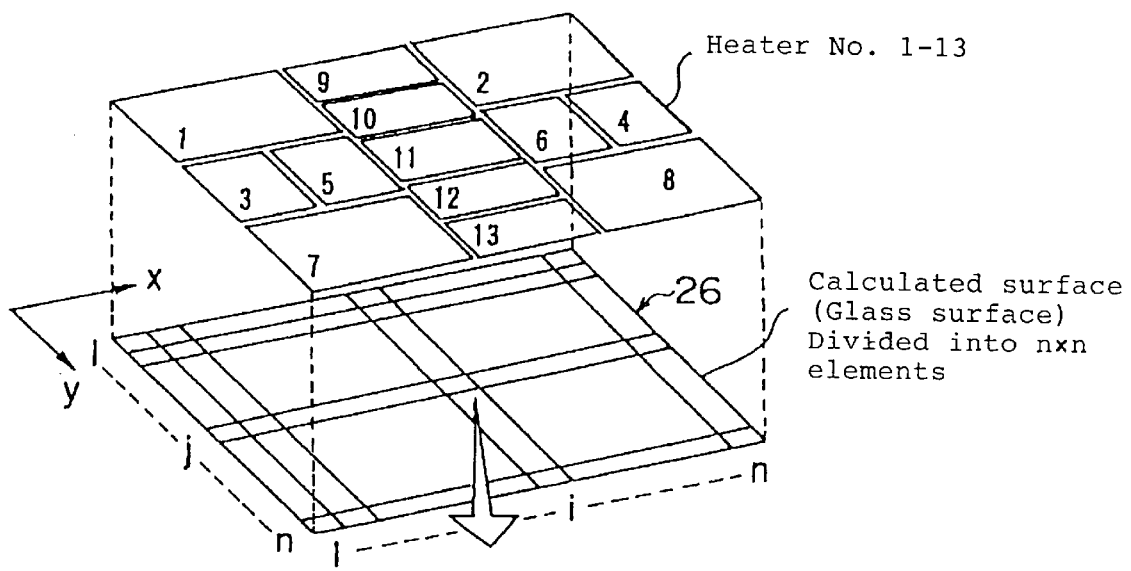
FIG. 10 is a schematic view explaining heat capacity received by elements of the glass sheet in accordance with the simulation of the present invention.
Figure 11:
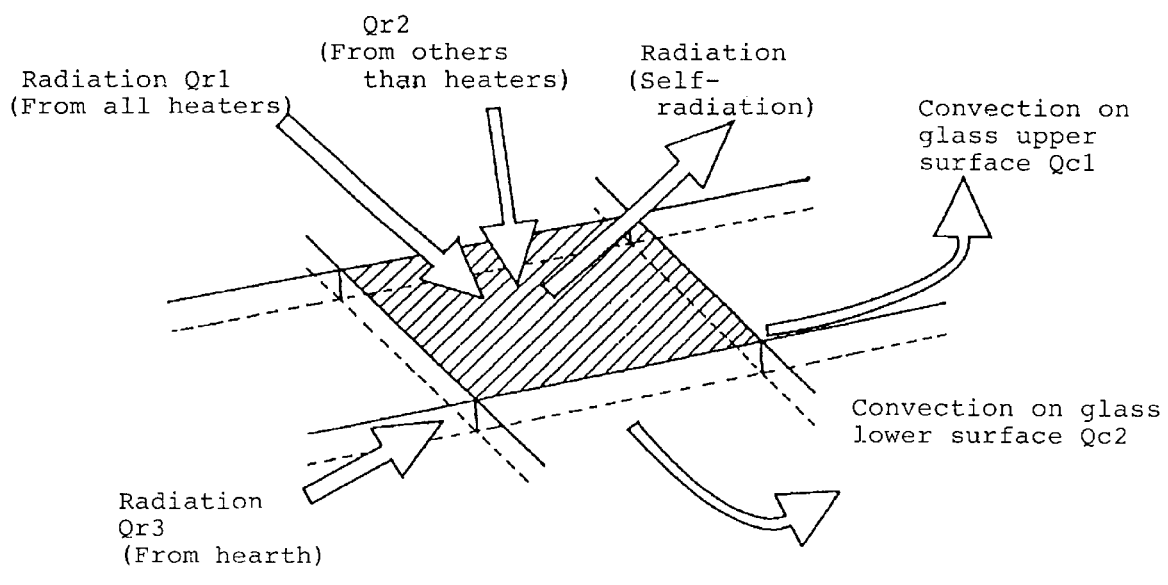
FIG. 11 is a schematic view explaining heat capacity received by one of the elements of the glass sheet in accordance with the simulation of the present invention.

In FIGS. 10 and 11 are shown schematic views to explain how to find heat quantity received by each of the elements in the glass sheet 26. In FIG. 10 is shown a zone which has the ceiling heaters thereof divided into No.1–No.13 of divisions for simplification in explanation. The zone includes the side heaters and the floor heaters not shown. The glass sheet 26 heated by these heaters is divided into n×n of elements. Heat capacity received by an element on a calculated surface [i, j] shown in FIG. 11 is noted. The computer mainframe 160 finds the heat capacity C according to the following formula:

$$C \cdot dT_G/dt = Q_{r1} + Q_{r2} + Q_{r2} - Q_{r4} - Q_{c1} - Q_{c2} \ (W) \quad (1)$$

$T_G$: element temperature of a glass sheet (an element on a calculated surface is treated as a concentrated heat capacity body.)

$Q_{r1}$: radiation heat quantity received from all heaters, which is found according to the following formula.

$$Q_{r1} = a\varepsilon_g A_g \sum_{n=1}^{m} aTk^4 \varepsilon_n F_{gn} \quad (2)$$

$Q_{r2}$: convection heat quantity received from an ambient temperature, which is found according to the following formula.

$$Q_{r2} = a\varepsilon_g A_g \sum_{n=1}^{m} aTk^4 \varepsilon_n F_{gn} \quad (3)$$

$Q_{r3}$: radiation heat quantity received from a hearth, which is found according to the following formula.

$$Q_{r3} = a\varepsilon_g A_g \sum_{n=1}^{m} aTk^4 \varepsilon_n F_{gn} \quad (4)$$

$Q_{r4}$: self-radiation heat of the glass sheet, which is found according to the following formula $$Q_{r4} = 2A_g \sigma Tk^4 \varepsilon_g \quad (5)$$

$Q_{c1}$: convection on an upper surface of the glass sheet, which is found according to the following formula.

$$Q_{c1} = A_g(T_g - T_U)k \quad (6)$$

$Q_{c2}$: convection on a lower surface of the glass sheet, which is found according to the following formula.

$$Q_{c2} = A_g(T_g - T_D)k \quad (6)$$

a: Stefan-Boltzumann constant
$T_n$: surface temperature of furnace element No.n
$\varepsilon_n$: radiation heat of furnace element No.n
$A_n$: area of furnace element No.n
$F_{gn}$: geometric factor of furnace element No.n as viewed from glass element
$\varepsilon_g$: radiation heat of glass
$T_g$: absolute temperature of a glass element
$A_g$: area of the glass element
$T_U$: ambient temperature at an upper portion in a furnace (absolute temperature)
$T_D$: ambient temperature at a lower portion in the furnace (absolute temperature)
K: heat transfer coefficient due to convection in the furnace The glass sheet is intermittently conveyed through the respective heating zones. The staying period in the respective heating zones are preset, depending on a preset tact time. The glass temperatures of the respective glass sheet elements which are given during staying in the heating zone 101 are found based on the heat capacity received by each of the elements in the heating zone 101 and the staying period of the glass sheet in the heating zone 101. Such finding is sequentially carried out with respect to the heating and annealing zone 102–105 in consideration of the glass temperatures of the respective elements in the preceding zones to obtain the glass temperatures of the respective elements in the respective zones (at respective times).

Next, the degree of sag for each of the elements is found based on the glass temperatures. This finding is carried out by a simulation technique as in the heat capacity finding as follows.

First, it is necessary to grasp the sagging speeds of the glass with respect to the glass temperatures before finding the degree of sag. This is because the degree of sag for each of the elements can be seen by adding up the sagging speeds based on a heating period.

Figure 12:
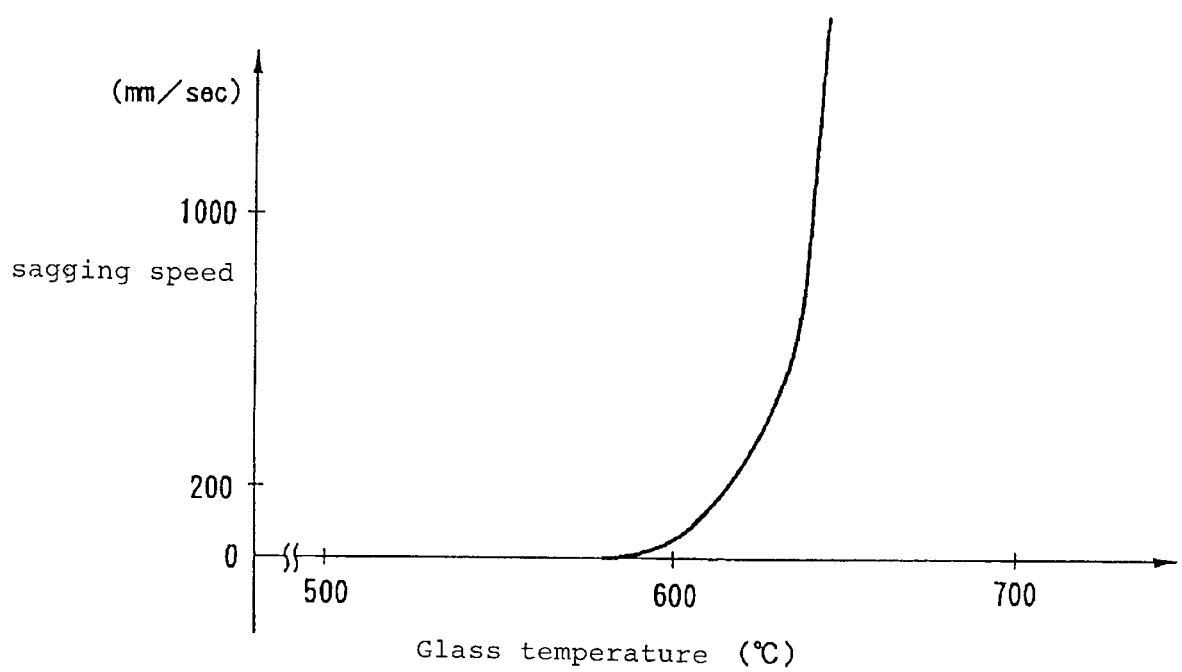
FIG. 12 is a graph of a relationship between glass temperatures and sagging speeds.
Figure 13:
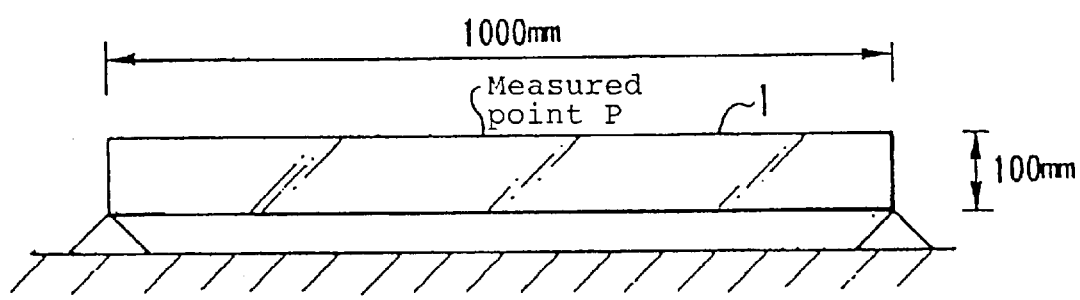
FIG. 13 is a schematic view explaining simulation finding of a sagging speed.

In FIG. 12 is shown a relationship between glass temperatures and glass sagging speeds. This figure shows that a sagging speed is almost zero when a glass temperature is under substantially 580° C. though a sagging speed has a tendency to rapidly increase when a glass temperature is beyond 580° C. This relationship is obtained by simulating a glass sheet 1 having dimensions shown in FIG. 13. Specifically, the degrees of sag of a measured point P at a central portion of the glass sheet 26 shown in this figure were found while the glass sheet was gradually heated to a forming temperature. Thus, the relationship between the glass temperatures and glass sagging speeds of FIG. 12 were obtained.

The degrees of sag of the respective elements of the glass sheet which has been conveyed through all zones can be obtained by calculating the degree of sag of each of the elements based on the found glass temperature of each of the elements in each of the zones (at each of the times) according to the relationship shown in FIG. 12 and adding up the degree of sag of each of the elements in each of the zones. Without carrying out calculations in the respective zones to obtain the total degree of sag, the degree of sag of each of the elements at each of the times which are obtained through all zones may be directly sought. The degree of sag of the entire glass sheet can be found by adding up the degrees of sag of the respective elements thus calculated. By such arrangement, the degree of curvature of the glass sheet 26 can be seen without checking on an actual apparatus.

When two glass sheets are piled and carried on a mold so as to be simultaneously bent, the provision of the two glass sheets has to be reflected on the simulation. Specifically, there are a technique wherein the provision of two piled glass sheets is taken into account in the calculation, and a technique wherein the provision of a glass sheet with a thickness equal to the total thickness of two glass sheets is taken into account in the calculation for simplification. Although the former technique provides simulated results closer to an actual bent shape, the latter technique can provide sufficiently practical simulated results.

Figure 14:
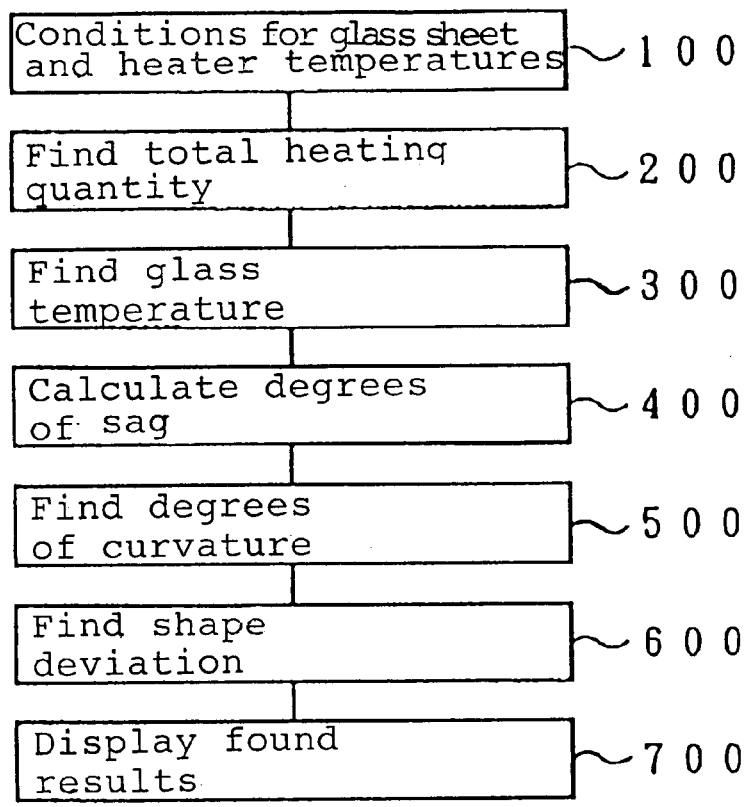
FIG. 14 is a flowchart showing how to find a degree of curvature of the glass sheet according to the present invention.

Now, the operation of a device for finding the degrees of curvature of a glass sheet constructed in accordance with the present invention as sated earlier will be explained, referring to the flowchart of FIG. 14.

First, the size and the thickness of a glass sheet 26 to be bent are inputted through the keyboard 140, and preliminarily set temperatures for each of the ceiling heaters 40, the side heaters 42 and the floor heaters 44 in the respective zones are set through the keyboard 140. Thus, initial setting is completed (Step 100).

When the initial setting has been completed, the computer mainframe 160 divides the glass sheets into a plurality of elements (n×n) as shown in FIG. 9.

Next, the radiation heating quantity from the heaters and the convection heating quantity from ambient temperatures which are received by each of the elements in each of the zones are found according to the formula (1) based on the inputted preliminarily set temperatures for the heaters. If needed, the heating quantity received by each of the elements in each of the zones is found by finding a heat quantity transferred in the thickness direction of the glass sheet (Step 200).

On the other hand, the initial temperature of the glass sheet in the heating zone 101 is set at a normal temperature, and unsteady finding is carried out to see how the temperature of each of the element of the glass sheet changes under the temperature in the heating zone 101. In accordance with the unsteady finding, the final temperatures of the glass sheet elements in the heating zones 101 are found based on the staying period of the glass sheet in this zone because the heating quantity received by the respective elements in this zone have been found. Next, the initial temperatures of the glass sheet elements at the heating zone 102 are set at the final temperatures at the heating zone 101, unsteady finding is carried out to see the temperatures of the respective glass sheet element change under the temperature in the heating zone 102. Then, unsteady finding is likewise carried out with respect to the heating and annealing zones 103–105. Thus, the glass temperatures of the respective glass sheet elements in the respective heating zones can be found (Step 300). Since the conveying tact time for the glass sheet has been set, the glass temperatures may be treated as glass temperatures at the respective times.

Next, the degrees of the curvature of the respective elements are calculated based on the found glass temperature of the respective elements according to the relationship of glass temperatures and sagging speeds (V) shown in FIG. 12 (Step 400).

The degrees of curvature in the entire glass sheet are found based on the calculated degrees of sag of the respective elements (Step 500).

Thus, required finding can be made without checking degrees of curvature of glass sheet on an actual apparatus.

The found shape of the glass sheet is compared to a desired designed shape of the glass sheet to find a shape deviation (Step 600), and the found results are displayed on the display 180 (Step 700). It is determined whether the found shape deviation is in an acceptable range, and if affirmative, bending glass sheets under the inputted conditions stated earlier starts. Conversely, if negative, the preliminarily set temperatures of the heaters among the inputted conditions are modified, and the finding is made in the procedure stated earlier until the found shape deviation is in the acceptable range.

Thus, glass sheets can be provided with a desired designed shape in accordance with this embodiment.

In the above-mentioned explanation, the color of glass sheets is not considered. Various kinds of colors of glass sheets for automobiles have been recently adopted because of diversification in kinds of automobiles, and not only usual transparent glass sheets but also bronze or green glass sheets have became frequently seen.

Since such colored glass sheets necessarily have different heat absorptivity depending on their colors, the sagging speed of colored glass sheets is faster than that of transparent glass sheets. If a relationship between glass temperatures and sagging speeds has been obtained with respect to many colored glass sheets in advance, it is possible to cope with finding the degree of curvature for many kinds of colored glass sheets.

Explanation of the simulation has been made with respect to a case wherein glass sheets are intermittently conveyed in the respective heating zones. The simulation can be also applied to a case wherein glass sheets are continuously conveyed at a substantially constant speed through all zones. In the latter case, the degrees of sag of the respective elements which have been conveyed through the all zones can be found by finding the glass temperatures of the respective elements at respective times instead of the glass temperatures of the respective elements in the respective zones.

The arrangement of the heater groups and the number of the heaters in the respective zones may be adequately determined. With regard to the profile of the molds, any profile such as a ring shape of profile and a non-ring shape of solid profile may be adequately determined, being matched to a targeted shape of glass sheets.

A ring shape of profile is preferable since a solid profile is required to have the profile of a solid portion determined with good precision for each glass sheet type. In particular, in case of a ring shape of profile, a portion of the profile which supports a glass sheet and a portion thereof which does not support the glass sheet can be clearly differentiated. Fine shape control for glass sheets can be carried out by adequately determining the heat quantity received by each of the portion with a glass sheet supported thereon and a portion thereof without the glass sheet supported thereon (including the heat quantity received by each of the portions with the lapse of time).

Although the mold returning zone 12 is provided under the furnace structure 11 in the example, the position of the mold returning zone may be adequately modified. For example, the position of the mold returning zone and the position of the furnace structure may be inverted. The mold returning zone and the furnace structure may be located side by side in the horizontal direction. Considering heat efficiency and limitation on the installing location of the apparatus, it is preferable that the mold returning zone 12 is provided under the furnace structure 11.

With regard to the technique that prevents the motion of the conveying device from being transmitted to the mold 30 in the annealing zone 105, any preferred technique may be adopted. Instead of lifting the mold above the conveying device as in the example, the mold may be shifted in a horizontal direction. Considering simplification in the mechanism and the limitation on the installing space, it is preferable to lift the mold since it is enough to disengage the mold from the conveying device.

In accordance with the apparatus for forming glass sheet according to the present invention, the staying period of the mold with a glass sheet carried thereon in the heating zone before the annealing zone is variable. This arrangement can successively produce glass sheets having different bent shapes, depending on different types, without using a complicated driving device.

In particular, a sufficient annealing period can be ensured without interference between the molds by adopting such treatment that the mold which has been conveyed into the annealing zone from the preceding heating zone at earlier timing is temporarily separated from the conveying device to be isolated from the motion of the mold in the preceding heating zone. Since the staying period of the mold in the heating zone before the annealing zone is variable, a required movement of the mold can be realized in preferable fashion.

In addition, the following finding in a degree of curvature of a glass sheet can realize simulation close to checking on an actual apparatus without checking a degree of curvature of a glass sheet on an actual apparatus. The degree of curvature of a glass sheet is found by dividing the glass sheet into a plurality of elements and finding the heating quantity received by the respective elements and the glass temperatures of the respective elements after having set dimensions of the glass sheet and the heater temperatures in the respective zones, and calculating the degree of sag of the respective elements based on the glass temperatures in the respective zones in consideration of the heat quantity received from the previous zones in the respective zones. By feeding back the bent shape thus found to the temperature setting of the heaters, forming glass sheets having a desired shape can be realized without bending sample glass sheets or with the number of forming for sampling decreased.

What is claimed is:

1. A method for bending glass sheets, comprising:
   providing a plurality of molds which are configured to carry the glass sheets;
   conveying the molds which carries the glass sheets into a heating furnace to bend the glass sheets so as to follow the molds, the heating furnace including a plurality of heating zones and an annealing zone which is provided downstream of the plurality of heating zones;
   heating the glass sheets to a forming temperature in the plurality of heating zones while the molds are conveyed in the plurality of heating zones, the molds staying for a certain period ($T_0$) in each of the plurality of heating zones except for a most downstream heating zone just before the annealing zone, a variable period ($T_1$) during which the molds stay in the most downstream heating zone being at most the certain period ($T_0$) and variable according to a target curvature of the glass sheets; and
   annealing the glass sheets in the annealing zone.

2. A method for bending glass sheets according to claim 1, wherein the molds are carried on a conveying device and are conveyed by driving the conveying device, and wherein, when the variable period ($T_1$) is shorter than the certain period ($T_0$), a mold that has stayed in the most downstream heating zone is retracted in a position to be disengaged from the conveying device in the annealing zone until a following mold located upstream of the mold in the annealing zone is conveyed into the most downstream heating zone just before the annealing zone.

3. A method for bending glass sheets according to claim 2, wherein before conveying the glass sheets into the heating furnace to actually bend the glass sheets, a simulated shape of a glass sheet is found by calculating a degree of curvature of a glass sheet in its entirety in accordance with a method for calculating a degree of curvature of the glass sheet including a first step for setting dimensions of the glass sheet and presetting temperatures of heaters provided in the respective heating zones; a second step for dividing the glass sheet into a plurality of elements and calculating a glass temperature in each of the elements in the respective heating zones based on a heating quantity received by each of the elements in the respective heating zones and a staying period of the glass sheet in the respective heating zones; a third step for calculating a degree of sag of each of the elements of the glass sheet in the respective heating zones based on the calculated glass temperature in each of the elements in the respective heating zones in consideration of a relationship between sagging speeds and glass temperatures of the glass sheet preliminarily found; and a fourth step for calculating a degree of curvature of the entire glass sheet conveyed through the entire heating zones based on the calculated degree of sag of each of the elements of the glass sheet in the respective heating zones, wherein the simulated shape of the glass sheet is compared to a preset desired designed shape of the glass sheet and set temperatures of the heaters are determined by modifying the preset temperatures of the respective heaters so as to bring the simulated shape of the glass sheet near to the desired design shape, and wherein the molds with the respective glass sheets carried thereon are conveyed through the respective heating zones.

4. A method for bending glass sheets according to claim 1, wherein before conveying the glass sheets into the heating furnace to actually bend the glass sheets, a simulated shape of a glass sheet is found by calculating a degree of curvature of a glass sheet in its entirety in accordance with a method for calculating a degree of curvature of the glass sheet including a first step for setting dimensions of the glass sheet and presetting temperatures of heaters provided in the respective heating zones; a second step for dividing the glass sheet into a plurality of elements and calculating a glass temperature in each of the elements in the respective heating zones based on a heating quantity received by each of the elements in the respective heating zones and a staying period of the glass sheet in the respective heating zones; a third step for calculating a degree of sag of each of the elements of the glass sheet in the respective heating zones based on the calculated glass temperature in each of the elements in the respective heating zones in consideration of a relationship between sagging speeds and glass temperatures of the glass sheet preliminarily found; and a fourth step for calculating a degree of curvature of the entire glass sheet conveyed through the entire heating zones based on the calculated degree of sag of each of the elements of the glass sheet in the respective heating zones, wherein the simulated shape of the glass sheet is compared to a preset desired designed shape of the glass sheet and set temperatures of the heaters are determined by modifying the preset temperatures of the respective heaters so as to bring the simulated shape of the glass sheet near to the desired design shape, and wherein the molds with the respective glass sheets carried thereon are conveyed through the respective heating zones.

5. A method for bending glass sheets, comprising:
   providing a plurality of molds which are configured to carry the glass sheets;

conveying the molds which carries the glass sheets into a heating furnace to bend the glass sheets so as to follow the molds, the heating furnace including a plurality of heating zones and an annealing zone which is provided downstream of the plurality of heating zones;

heating the glass sheets to a forming temperature in a plurality of heating zones while the molds are conveyed in the plurality of heating zones; and annealing the glass sheets in an annealing zone which is provided downstream of the plurality of heating zones, wherein before conveying the glass sheets into the heating furnace to actually bend the glass sheets, a simulated shape of a glass sheet is found by calculating a degree of curvature of the glass sheet in its entirety in accordance with a method for calculating a degree of curvature of the glass sheet, the method for calculating the degree of the curvature comprising:

a first step to set dimensions of the glass sheet and to preset temperatures of heaters provided in the respective heating zones;

a second step to divide the glass sheet into a plurality of elements and to calculate a glass temperature in each of the elements in the respective heating zones based on a heating quantity received by each of the elements in the respective heating zones and a staying period of the glass sheet elements in the respective heating zones;

a third step to calculate a degree of sag of each of the elements of the glass sheet in the respective heating zones based on the calculated glass temperature in each of the elements in the respective heating zones in consideration of a relationship between sagging speeds and glass temperatures of the glass sheet preliminarily found; and a fourth step to calculate a degree of curvature of the entire glass sheet conveyed through the entire heating zones based on the calculated degree of sag of each of the elements of the glass sheet in the respective heating zones, and wherein the simulated shape of the glass sheet is compared to a preset desired design shape of the glass sheet and set temperatures of the heaters are determined by modifying the preset temperatures of the respective heaters so as to bring the simulated shape of the glass sheet to be a desired design shape, and wherein the molds with the respective glass sheets carried thereon are conveyed through the respective heating zones.

6. A method for bending glass sheets according to claim 5, wherein when the glass temperature in each of the elements in the respective heating zones is calculated in the second step, the glass temperature in each of the elements in the zones just before the respective heating zones is set as an initial temperature.

7. An apparatus for bending glass sheets, comprising:
a plurality of molds configured to carry the glass sheets;
a heating furnace which includes a plurality of heating zones to heat the glass sheets to a forming temperature and an annealing zone provided downstream of the heating zones to anneal the glass sheets;
a conveying device configured to convey the molds into the heating furnace to bend the glass sheets so as to follow the molds, the conveying device conveying the molds from upstream of the heating zones to downstream of the annealing zone through the heating zones and the annealing zone; and a controller configured to control the conveying device such that the molds stay for a certain period ($T_0$) in the respective heating zones except for a most downstream heating zone just before the annealing zone and such that a period ($T_1$) during which the molds stay in the most downstream heating zone just before the annealing zone is variable and at most the certain period ($T_0$).

8. An apparatus for bending glass sheets according to claim 7, wherein the molds are carried on a conveying device so as to be conveyed by driving the conveying device, and the annealing zone is provided with a lifting device for temporarily lifting a mold from the conveying device.

9. An apparatus for bending glass sheets according to claim 8, wherein a wall of the heating furnace which is located between the heating zones and the annealing zone is provided with a door entry opening, though which a first door gets in and out of the heating furnace so as to be opened and closed in association with entry of a mold, and wherein a box shaped enclosure which has an enclosure opening on a side of the door entry opening is provided on an outer surface of the heating furnace at an outer periphery of the door entry opening to abut the outer surface so as to contain the door entry opening in an inner periphery of the enclosure opening and to project outwardly from the heating furnace, and the door is housed in the box shaped enclosure in an opening state.

10. An apparatus for bending glass sheets according to claim 8, wherein a returning zone for returning a mold with a formed glass sheet removed to an inlet of the heating furnace is provided to the heating furnace side by side, the heating furnace has an outer side of the inlet provided with a second door to be opened and closed in association with entry of a mold into the heating furnace, and the heating furnace has an outer side of an outlet provided with a second door to be opened and closed in association with removal of a mold out of the heating furnace.

11. An apparatus for bending glass sheets according to claim 9, wherein a returning zone for returning a mold with a formed glass sheet removed to an inlet of the heating furnace is provided to the heating furnace side by side, the heating furnace has an outer side of the inlet provided with a second door to be opened and closed in association with entry of a mold into the heating furnace, and the heating furnace has an outer side of an outlet provided with a second door to be opened and closed in association with removal of a mold out of the heating furnace.

12. An apparatus for bending glass sheets according to claim 7, wherein a wall of the heating furnace which is located between the heating zones and the annealing zone is provided with a door entry opening, though which a first door gets in and out of the heating furnace so as to be opened and closed in association with entry of a mold, and wherein a box shaped enclosure which has an enclosure opening on a side of the door entry opening is provided on an outer surface of the heating furnace at an outer periphery of the door entry opening to abut the outer surface so as to contain the door entry opening in an inner periphery of the enclosure opening and to project outwardly from the heating furnace, and the door is housed in the box shaped enclosure in an opening state.

13. An apparatus for bending glass sheets according to claim 12, wherein a returning zone for returning a mold with a formed glass sheet removed to an inlet of the heating furnace is provided to the heating furnace side by side, the heating furnace has an outer side of the inlet provided with a second door to be opened and closed in association with entry of a mold into the heating furnace, and the heating furnace has an outer side of an outlet provided with a second door to be opened and closed in association with removal of a mold out of the heating furnace.

14. An apparatus for bending glass sheets according to claim 7, wherein a returning zone for returning a mold with a formed glass sheet removed to an inlet of the heating furnace is provided to the heating furnace side by side, the heating furnace has an outer side of the inlet provided with a second door to be opened and closed in association with entry of a mold into the heating furnace, and the heating furnace has an outer side of an outlet provided with a second door to be opened and closed in association with removal of a mold out of the heating furnace.

* * * * *

UNITED STATES PATENT AND TRADEMARK OFFICE
CERTIFICATE OF CORRECTION

PATENT NO. : 6,240,746 B1
DATED : June 5, 2001
INVENTOR(S) : Maeda et al.

Page 1 of 1

It is certified that error appears in the above-identified patent and that said Letters Patent is hereby corrected as shown below:

<u>Title page,</u>
Item [75], the Inventors' information should read:

-- [75]  Inventors:  Kenji Maeda, Toshimi Yajima;
                      Katsuki Saito, all of Chita-gun;
                      Yasuichi Ueno, Aiko-gun;
                      Masaaki Konishi, Yokohama-shi;
                      Hiroshi Yamakawa, Aiko-gun, all of (JP) --;

Item [30], the Foreign Application Priority information should read:

-- [30]  Foreign Application Priority Data

Apr. 4, 1997  (JP) ...............................9-86975
        Apr. 4, 1997  (JP) ...............................9-87002 --

Signed and Sealed this

Twenty-sixth Day of March, 2002

Attest:

*Attesting Officer*

JAMES E. ROGAN
*Director of the United States Patent and Trademark Office*